United States Patent
Zhao et al.

(10) Patent No.: US 11,285,934 B2
(45) Date of Patent: Mar. 29, 2022

(54) REGULATING POWERTRAINS IN ELECTRIC VEHICLES USING DRIVING PATTERN RECOGNITION

(71) Applicant: CHONGQING JINKANG POWERTRAIN NEW ENERGY CO., LTD., Chongqing (CN)

(72) Inventors: Ruxiu Zhao, Santa Clara, CA (US); Min Tian, Santa Clara, CA (US); Tung-Yan Wu, Santa Clara, CA (US); Zhensheng Yuan, Santa Clara, CA (US); Yinghan Xu, Santa Clara, CA (US)

(73) Assignee: CHONGQING JINKANG POWERTRAIN NEW ENERGY CO., LTD., Chongqing (CN)

( * ) Notice: Subject to any disclaimer, the term of this patent is extended or adjusted under 35 U.S.C. 154(b) by 165 days.

(21) Appl. No.: 16/679,926

(22) Filed: Nov. 11, 2019

(65) Prior Publication Data

US 2021/0139013 A1    May 13, 2021

(51) Int. Cl.
*B60W 10/08* (2006.01)
*B60L 15/20* (2006.01)

(52) U.S. Cl.
CPC ............ *B60W 10/08* (2013.01); *B60L 15/20* (2013.01); *B60L 2240/12* (2013.01); *B60L 2240/14* (2013.01)

(58) Field of Classification Search
None
See application file for complete search history.

(56) References Cited

U.S. PATENT DOCUMENTS

| | | | |
|---|---|---|---|
| 2015/0202990 A1* | 7/2015 | Grossard | G06Q 50/30 701/22 |
| 2016/0023649 A1* | 1/2016 | Muller | B60W 20/13 701/22 |
| 2016/0318501 A1* | 11/2016 | Oldridge | B60W 20/10 |
| 2019/0366855 A1* | 12/2019 | Oh | B60W 30/20 |
| 2019/0367031 A1* | 12/2019 | Tanaka | B60W 30/18045 |
| 2020/0307384 A1* | 10/2020 | Mendez Pineda | B60L 7/18 |

* cited by examiner

*Primary Examiner* — Todd Melton
*Assistant Examiner* — Jason R Roberson
(74) *Attorney, Agent, or Firm* — Cooper Legal Group, LLC

(57) ABSTRACT

Provided herein are systems and methods of regulating vehicle powertrains in electric vehicles using driving patterns. A vehicle control unit (VCU) can be disposed in the electric vehicle. The VCU can maintain operation profiles. Each operation profile can specify a set of regulation parameters to be applied to the vehicle powertrain for motion measurement and an engine measurement identified as associated with an environmental condition. The VCU can compare the motion measurement and the engine measurement acquired from the sensor with the motion measurement and the engine measurement specified by an operation profile. The VCU can select an operation profile based on the comparison. The VCU can identify the set of regulation parameters for an environmental condition specified by the operation profile. The VCU can apply the set of regulation parameters to the vehicle powertrain to control the propulsion of the electric vehicle in accordance with the operation profile.

20 Claims, 6 Drawing Sheets

REGULATING POWERTRAINS IN ELECTRIC VEHICLES USING DRIVING PATTERN RECOGNITION

BACKGROUND

A vehicle can include one or more components to generate and transfer mechanical power to a driving surface to propel the vehicle.

SUMMARY

The present disclosure is directed to systems and methods of regulating vehicle powertrains in electric vehicles using driving patterns. A vehicle control unit of a vehicle can maintain a set of operation profiles pre-generated by a remote server. Each operation profile can specify predetermined, optimal parameters to apply to a vehicle powertrain of the vehicle for a certain motion measurements (e.g., a velocity and acceleration) and engine measurements (e.g., motor torque) for the operation profile. Each operation profile can be identified as associated with a particular environmental condition (e.g., highway, urban, and suburban). During the operation of the vehicle, the vehicle control unit can identify motion and engine measurements of the vehicle from a sensor. The vehicle control unit can determine a similarity metric (e.g., a Euclidean distance) between the acquired measurements and the measurements specified in the operation profiles to find an operation profile with the closest distance. Upon finding the operation profile, the vehicle control unit can apply the parameters to the vehicle powertrain to control propulsion of the vehicle. By having the operation profiles pre-generated by the remote server, the environmental condition and the optimal parameters for the environmental condition can be determined, without relying on complex classification algorithms or specialized hardware components.

At least one aspect is directed to a system to regulate vehicle powertrains in electric vehicles using driving patterns. The system can include a sensor disposed in an electric vehicle to acquire a motion measurement and an engine measurement of the electric vehicle. The motion measurement can include at least one of a velocity of the electric vehicle and an acceleration of the electric vehicle. The engine measurement can include an amount of motor torque applied by a vehicle powertrain in controlling propulsion of the electric vehicle. The system can include a vehicle control unit having one or more processors disposed in the electric vehicle. The vehicle control unit can maintain a plurality of operation profiles. Each of the plurality of operation profiles can specify a set of regulation parameters to be applied to the vehicle powertrain for at least one of a motion measurement and an engine measurement identified as associated with one of a plurality of environmental conditions. The vehicle control unit can compare the motion measurement and the engine measurement acquired from the sensor with the motion measurement and the engine measurement specified by at least one of the plurality of operation profiles. The vehicle control unit can select an operation profile from the plurality of operation profiles based on the comparison between the motion measurement and the engine measurement acquired from the sensor with the motion measurement and the engine measurement specified by the operation profile. The vehicle control unit can identify the set of regulation parameters for one the plurality of environmental conditions specified by the operation profile selected from the plurality of operation profiles. The vehicle control unit can apply the set of regulation parameters to the vehicle powertrain to control the propulsion of the electric vehicle in accordance with the operation profile.

At least one aspect is directed to an electric or other type of vehicle. The electric vehicle can include a vehicle powertrain to control propulsion. The electric vehicle can include a sensor to acquire a motion measurement and an engine measurement. The motion measurement can include at least one of a velocity and an acceleration. The engine measurement can include an amount of power applied by the vehicle powertrain in controlling propulsion. The electric vehicle can include a vehicle control unit having one or more processors. The vehicle control unit can maintain a plurality of operation profiles. Each of the plurality of operation profiles can specify a set of regulation parameters to be applied to the vehicle powertrain for at least one of a motion measurement and an engine measurement identified as associated with one of a plurality of environmental conditions. The vehicle control unit can compare the motion measurement and the engine measurement acquired from the sensor with the motion measurement and the engine measurement specified by at least one of the plurality of operation profiles. The vehicle control unit can select an operation profile from the plurality of operation profiles based on the comparison between the motion measurement and the engine measurement acquired from the sensor with the motion measurement and the engine measurement specified by the operation profile. The vehicle control unit can identify the set of regulation parameters for one the plurality of environmental conditions specified by the operation profile selected from the plurality of operation profiles. The vehicle control unit can apply the set of regulation parameters to the vehicle powertrain to control the propulsion in accordance with the operation profile.

At least one aspect is directed to a method of regulating vehicle powertrains in electric vehicles using driving patterns. The method can include acquiring, by a sensor disposed in an electric vehicle, a motion measurement and an engine measurement of the electric vehicle. The motion measurement can include at least one of a velocity of the electric vehicle and an acceleration of the electric vehicle. The engine measurement can include an amount of motor torque applied by a vehicle powertrain in controlling propulsion of the electric vehicle. The method can include maintaining, by a vehicle control unit having one or more processors disposed in the electric vehicle, a plurality of operation profiles. Each of the plurality of operation profiles can specify a set of regulation parameters to be applied to the vehicle powertrain for at least one of a motion measurement and an engine measurement identified as associated with one of a plurality of environmental conditions. The method can include selecting, by the vehicle control unit, an operation profile from the plurality of operation profiles based on the comparison between the motion measurement and the engine measurement acquired from the sensor with the motion measurement and the engine measurement specified by the operation profile. The method can include identifying, by the vehicle control unit, the set of regulation parameters for one the plurality of environmental conditions specified by the operation profile selected from the plurality of operation profiles. The method can include applying, by the vehicle control unit, the set of regulation parameters to the vehicle powertrain to control the propulsion of the electric vehicle in accordance with the operation profile.

At least one aspect is directed to a method of providing vehicle control units to regulate vehicle powertrains in electric vehicles using driving patterns. The method can include providing a vehicle control unit having one or more processors in an electric vehicle. The vehicle control unit can maintain a plurality of operation profiles. Each of the plurality of operation profiles can specify a set of regulation parameters to be applied to the vehicle powertrain for at least one of a motion measurement and an engine measurement identified as associated with one of a plurality of environmental conditions. The vehicle control unit can compare a motion measurement and an engine measurement acquired from a sensor with the motion measurement and the engine measurement specified by at least one of the plurality of operation profiles. The vehicle control unit can select an operation profile from the plurality of operation profiles based on the comparison between the motion measurement and the engine measurement acquired from the sensor with the motion measurement and the engine measurement specified by the operation profile. The vehicle control unit can identify the set of regulation parameters for one the plurality of environmental conditions specified by the operation profile selected from the plurality of operation profiles. The vehicle control unit can apply the set of regulation parameters to the vehicle powertrain to control the propulsion of the electric vehicle in accordance with the operation profile.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
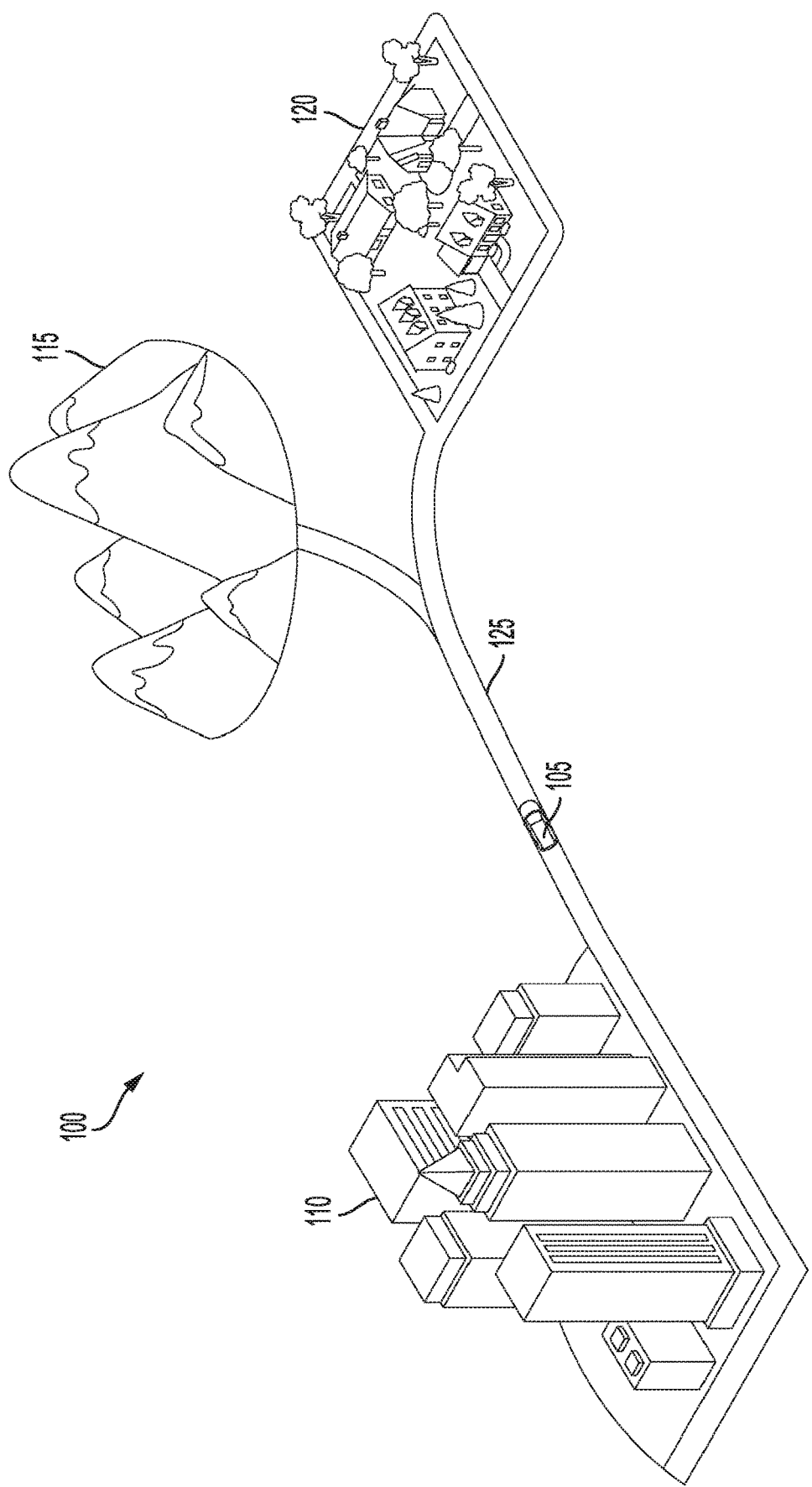
FIG. 1 is a diagram depicting an example environment for electric vehicles.

Following below are more detailed descriptions of various concepts related to, and implementations of, methods, apparatuses, and systems of regulating vehicle powertrains in electric vehicles using driving patterns. The various concepts introduced above and discussed in greater detail below may be implemented in any of numerous ways.

Described herein are systems and methods of regulating vehicle powertrains in vehicular settings using driving patterns. Vehicular settings can include vehicles, such as electric vehicles, hybrid vehicles, fossil fuel powered vehicles, automobiles, motorcycles, passenger vehicles, trucks, planes, helicopters, submarines, or vessels. In traveling through different environments, a vehicle can undergo different dynamics and energy consumption. For example, a vehicle traveling through a mountainous terrain may have to apply a greater amount of motor torque in a powertrain to achieve the same speed as a vehicle traveling through a more planar driving surfaces, such as a highway or a suburb. Recognizing driving patterns and the environment about the vehicle can facilitate in the selection of an optimal control strategy for the powertrain of the vehicle, thus leading to better energy consumption and fuel economy.

There may be several approaches to utilize driving pattern recognition in determining and selecting a control strategy for the vehicle. One such approach may entail route planning and road condition recognition within an autonomous driving system relying on specialized cameras and lidar sensors. Another approach may involve complex algorithms (e.g., classification algorithms and neural networks) with heavy amount of computation and processing time. In addition, some of these approaches may frequently prompt the driver for input of the road condition. For example, a dashboard of the vehicle may prompt the driver to press a button to indicate which driving condition (e.g., highway or mountainous road) the vehicle is in. Overall, such approaches may be limited in terms of complexity, impracticality, and cost. Furthermore, all these approaches may suffer from inability to automatically detect driving conditions.

To address these and other technical challenges, on-board measurements of the vehicle's motion and engine can be leveraged by a vehicle control unit to determine and set the optimal control strategy of the powertrain of the vehicle. The vehicle control unit can be an embedded system with microprocessors and memory to control various functions of the vehicle powertrain. The vehicle can have one or more sensors to instrument the vehicle's velocity and acceleration, as well as the motor torque applied by the engine. The vehicle control unit may have been provided with a predefined set of operation profiles from a remote server. Each operation profile can define parameters to control the powertrain at a particular measurement of the vehicle's motion and engine. The parameters may have been determined by the server to be optimal in terms of energy consumption and fuel efficiency for the particular driving conditions and measurements. The operation profile can be identified as associated a particular driving condition. The measurements specified for the operation profile can be arranged as a feature vector.

During the operation of the vehicle, the vehicle control unit can acquire measurements of the vehicle's motion and engine from the on-board sensors, and can be formed into a feature vector. With the acquisition, the vehicle control unit can compare the feature vector formed from the measurements with the feature vector in each of the operation profiles. In comparing, the vehicle control unit can calculate a distance (e.g., a Euclidean distance) between the two feature vectors, and can find the operation profile with the feature vector of the closest distance. Once found, the vehicle control unit can identify the parameters defined by the operation profile as the optimal for the given feature vector. The vehicle control unit can also determine the driving conditions undergone by the vehicle using the operation profile. Upon identifying, the vehicle control unit can apply the parameters to the powertrain, adjusting power consumption and motor torque in accordance with the operation profile.

Because the computation of the distance can be performed in near real-time (at O(1) time complexity), the vehicle control unit can recognize common as well as unusual driving condition from the sensor measurements of the vehicle's motion and engine. Furthermore, the vehicle control unit can make such determinations without the reliance on specialized sensors or processors to perform complex algorithms. Thus, the vehicle control unit can acquire measurements from non-specialized sensors, thereby increasing hardware reliability and enlarging the utility of the determination of the optimal operational profile. Furthermore, the performance of the determination of the optimal operational profile can be quicker relative to such approaches, as less computationally complex methods can be employed.

FIG. 1, among others, depicts a diagram of an environment 100 for electric vehicles. The environment 100 can include at least one vehicle 105, such as an electric vehicle (that can be or include a hybrid vehicle), a hybrid vehicle, or an internal combustion engine vehicle, among others. The vehicle 105 can be any type of transportation vehicle, such as an automobile (e.g., a passenger sedan, a truck, a bus, or a van), motorcycle, an airplane, a helicopter, a locomotive, or a watercraft, among others. The vehicle 105 can travel through any type environment. For example, as depicted, the vehicle 105 can traverse through an urban environment 110, a mountainous terrain 115, a suburban environment 120, or a highway 125, among others.

As the vehicle 105 traverses the different types of environment 100, the power consumption by the engine (or the powertrain or drivetrain) in the vehicle 105 can change due to different driving conditions arising from each type of environment 100. For example, to maintain the same velocity, the vehicle 105 can apply a higher motor torque in the mountainous terrain 115 than on a relatively planar surface, such as the highway 125. In addition, given the high density of intersection in urban environments 110, the vehicle 105 may undergo a greater amount of engine idle time in the urban environments 110 than suburban environments 120 or highways 125. With the disparities, the optimal control strategy for engine of the vehicle 105 may differ among the different types of environment 100.

Figure 2:
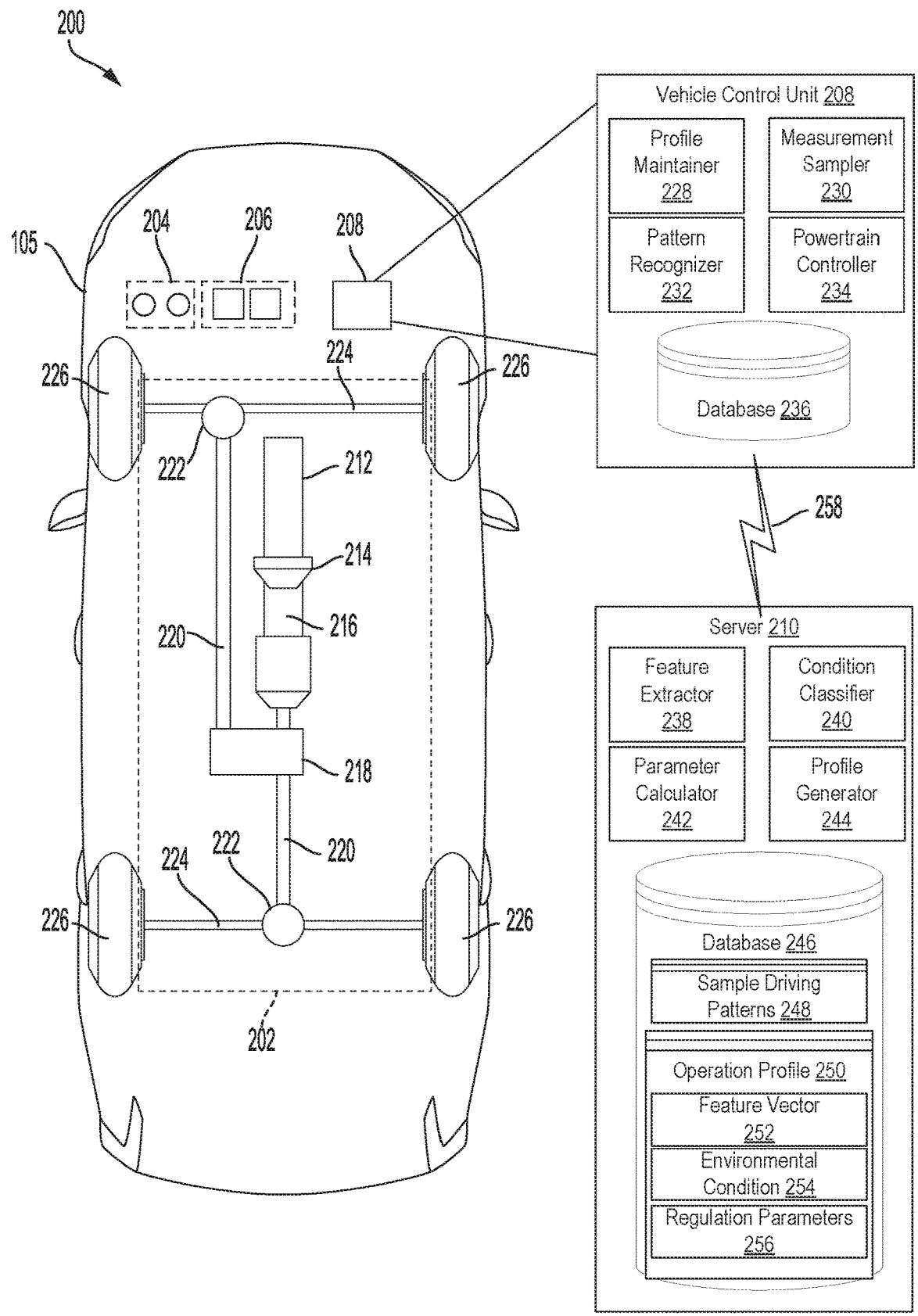
FIG. 2 is a block diagram depicting an example system to regulate vehicle powertrains in electric vehicles using driving patterns.

FIG. 2, among others, depicts a block diagram of a system 200 to regulate vehicle powertrains in electric vehicles using driving patterns. The system 200 can include the vehicle 105. The vehicle 105 in the system 200 can be traveling through the environment 100. The vehicle 105 can include at least one powertrain 202 (sometimes referred herein as a vehicle powertrain). The powertrain 202 can include one or more components disposed in the vehicle 105 (e.g., along a chassis frame of the vehicle 105) to control propulsion of the vehicle 105. The components of the powertrain 202 can convert mechanical power from at least one power source to deliver to the environment 100 to propel the vehicle 105. In an electric vehicle, the power source in the powertrain 202 can include a set of battery packs storing electrical energy. In an internal combustion engine vehicle, the power source in the powertrain 202 can include at least one reservoir storing fuel. In a hybrid vehicle, the power sources in the powertrain 202 can include both the battery packs and the fuel reservoir. The powertrain 202 can deliver mechanical power to the environment 100 via any drive wheel configuration, such as a rear-wheel drive, a front-wheel drive, a four-wheel drive (e.g., as depicted), or an all-wheel drive, among others.

The powertrain 202 can include at least one motor unit 212 (sometimes referred herein as a motor or an engine). The motor unit 212 can include one or more components disposed within the vehicle 105. The motor unit 212 can generate and produce mechanical power to deliver to the environment 100 and propel the vehicle 105. In an electric vehicle, the motor unit 212 can include a set of electric motors to convert electrical energy from the battery pack into mechanical power via the electric motors. In an internal combustion engine vehicle, the motor unit 212 can include at least one internal combustion engine to convert fuel (e.g., a petrochemical substance) into mechanical power via combustion. In a hybrid vehicle, the motor unit 212 can include both the electric motors to convert electrical energy and the internal combustion engine to convert the fuel to mechanical power. The components of the powertrain 202 excluding the motor unit 212 can be part of a drivetrain of the vehicle 105.

The powertrain 202 can include at least one torque converter 214. The torque converter 214 can be disposed within the vehicle 105, and can be mechanically coupled with the motor unit 212. Mechanically coupled to the motor unit 212, the torque converter 214 can receive the mechanical power generated by the motor unit 212. The torque converter 214 can transfer the mechanical power generated by the motor unit 212 to other components of the powertrain 202. The torque converter 214 can include a set of rotating components to turn the mechanical power generated by the motor unit 212 into torque to be transferred to other components of the powertrain 202. In addition, the torque converter 214 can regulate the amount of torque outputted from the motor unit 212 by increasing or decreasing. The powertrain 202 can lack the torque converter 214 when the vehicle 105 is an electric vehicle, and the mechanical power can be directly transferred from the motor unit 212 to the other components of the powertrain 202. The powertrain 202 can include the torque converter 214 when the vehicle 105 is a hybrid vehicle or an internal combustion engine vehicle.

The powertrain 202 can include at least one transmission unit 216 (sometimes referred herein as a gearbox). The transmission unit 216 can be disposed within the vehicle 105, and can be mechanically coupled with the torque converter 214 and the motor unit 212 (via the torque converter 214). Mechanically coupled with the torque converter 214 and the motor unit 212, the transmission unit 216 can receive the mechanical power from the motor unit 212 via the torque converter 214. The transmission unit 216 can also transfer the mechanical power from the motor unit 212 via the torque converter 214 to other components of the powertrain 202. The transmission unit 216 can regulate, set, or otherwise control the amount of mechanical power outputted to other components of the powertrain 202 in accordance with a set velocity, acceleration, or torque for the vehicle 105. In controlling the output amount, the transmission unit 216 can increase, decrease, or maintain the amount of mechanical power transferred from the torque converter 214 to the other components of the powertrain 202.

The powertrain 202 can include at least one transfer case 218. The transfer case 218 can be disposed within the vehicle 105, and can be mechanically coupled with the transmission unit 216, the torque converter 214 (via the transmission unit 216), and the motor unit 212 (via the torque converter 214). Mechanically coupled, the transfer case 218 can receive the mechanical power from the motor unit 212 via the torque converter 214 and the transmission unit 216. The transfer case 218 can also transfer mechanical power to other components of the powertrain 202. The other components of the powertrain 202 to which the transfer case 218 transfers the mechanical power can be disposed towards opposite sides of the powertrain 202. The powertrain 202 can include the transfer case 218 when in a four-wheel drive configuration or an all-wheel drive configuration. The powertrain 202 can lack the transfer case 218 when in a forward-wheel drive or a rear-wheel drive configuration, and the mechanical power can be transferred directed from the transmission unit 216 to the other components.

The powertrain 202 can include at least one driveshaft 220 (sometimes referred herein as a shaft). The driveshaft 220 can be disposed within the vehicle 105. The driveshaft 220 can be mechanically coupled with the transfer case 218, the transmission unit 216 (via the transfer case 218), the torque converter 214 (via the transmission unit 216), and the motor unit 212 (via the torque converter 214). Mechanically coupled, the driveshaft 220 can receive mechanical power from the motor unit 212 via the torque converter 214, the transmission unit 216, and the transfer case 218. The driveshaft 220 can also transfer mechanical power transferred from the transmission unit 216 and originating from the motor unit 212 to other components of the powertrain 202. The other components to which the driveshaft 220 can transfer the mechanical power can be disposed in the vehicle 105 at a distance separate from the transmission unit 216.

The powertrain 202 can include at least one differential unit 222. The differential unit 222 can be disposed within the vehicle 105. The differential unit 222 can be mechanically coupled with the driveshaft 220, the transfer case 218 (via the driveshaft 220), the transmission unit 216 (via the transfer case 218), the torque converter 214 (via the transmission unit 216), and the motor unit 212 (via the torque converter 214). Mechanically coupled, the differential unit 222 can receive the mechanical power generated by the motor unit 212 via the torque converter 214 and the transmission unit 216. The differential unit 222 can further transfer the mechanical power to other components of the powertrain 202. The differential unit 222 can also regulate or control the amount of mechanical power transferred out to the other components of the powertrain 202, in response to the vehicle 105 performing a turn while moving through the environment 100.

The powertrain 202 can include a set of drive axles 224, such as a front axle 224 (depicted toward the top) and a back axle 224 (depicted toward the bottom). Each drive axle 224 can be at least partially disposed within the vehicle 105, and can be mechanically coupled with one or more components of the powertrain 202. Each drive axle 224 can receive the mechanical power from the motor unit 212 via the driveshaft 220, the transfer case 218, the transmission unit 216, and the torque converter 214. By rotating, the drive axle 224 can also transfer the mechanical power to the environment 100 to propel the vehicle 105. The front drive axle 224 can transfer the mechanical power from towards the front of the vehicle 105 to the environment 100, and the rear drive axle 224 can transfer the mechanical power from towards the rear of the vehicle 105 to the environment 100.

The vehicle 105 can include a set of wheels 226. The vehicle 105 can include any number of wheel 226, ranging from 2 to 8. For example, as depicted, the vehicle 105 can have four wheel 226, a front-left wheel, a front-right wheel, a rear-left wheel, and a rear-right wheel. Each wheel 226 can be disposed at least partially in the vehicle 105, and can be mechanically coupled with one or more components of the powertrain 202. Each wheel 226 can be mechanically coupled with one of the drive axles 224, the differential unit 222 (via the drive axle 224), the transfer case 218 (via the differential unit 222), the transmission unit 216 (via the transfer case 218), the torque converter 214 (via the transmission unit 216), and the motor unit 212 (via the torque converter 214). Mechanically coupled, each wheel 226 can receive the mechanical power from the motor unit 212 via the other components of the powertrain 202. Each wheel 226 can also transfer the mechanical power from the motor unit 212 to the environment 100 to propel the vehicle 105 in the environment 100.

The vehicle 105 can include a set of sensors 204. Each sensor 204 can be disposed within the vehicle 105. The sensors 204 can acquire a set of measurements on the vehicle 105 during the operation of the vehicle 105. A single sensor 204 or multiple sensors 204 can be used to acquire various types of measurements. The set of measurements acquired by the sensors 204 can include one or more motion measurements. The motion measurements can relate to the movement of the vehicle 105 through the environment 100 over a sampling time window. The sampling time window for each measurement can define an amount of time over which the set of measurements are taken, and can range between 30 seconds to 10 minutes. The motion measurements over the sample time window can include, for example, a speed, a velocity, an acceleration, and a deceleration, among others. The speed of the vehicle 105 can indicate a distance traveled by the vehicle 105 over time. The velocity of the vehicle 105 can indicate a rate of change in position of the vehicle 105 over a time in a direction of motion. The acceleration or deceleration of the vehicle 105 can indicate a change in the speed or velocity of the vehicle 105 over time. The motion measurements can include statistical metrics of the speed, velocity, or acceleration over the time window, such as an average, a minimum, a maximum, a variance, a standard deviation, and skewness, among others. The sensors 204 for acquiring the motion measurements can include, for example, a vehicle speed sensor (VSS), a wheel speed sensor, a global position system (GPS) unit, and an inertial measurement unit (IMU), among others. A single sensor 204 or multiple sensors 204 can be used to acquire the various types of motion measurements.

The set of measurements acquired by the sensors 204 can also include one or more engine measurements. The engine measurements can relate to the performance of the powertrain 202 in controlling the propulsion of the vehicle 105 while traveling through the environment 100. The sampling time window for each measurement can define an amount of time over which the set of measurements are taken, and can range between 30 seconds to 10 minutes. The engine measurements can include, for example, a motor torque applied through the powertrain 202, a rotation metric of the motor unit 212 in applied the motor torque, an engine state of the motor unit 212, an engine idle time and an engine active time of the motor unit 212, and an engine temperature of the motor unit 212, among others. The motor torque can indicate an amount of rotational mechanical power is delivered through the powertrain 202. The rotation metric can indicate a speed of rotations (e.g., rotations per minute) of the motor unit 212 in turning other components of the powertrain 202. The engine state can indicate whether the motor unit 212 is idle (e.g., delivering any mechanical power below a certain threshold) or active (e.g., delivering mechanical power over the threshold). The engine idle time can indicate an amount of time that the motor unit 212 is idle and delivering mechanical power through the remainder of the powertrain 202 that is below the threshold. The threshold can demarcate an amount of output mechanical power at which the motor unit 212 is considered idle or active. For example, the threshold can correspond to an amount of output mechanical power resulting in a speed of 0 to 5 km/h. Conversely, the engine active time can indicate an amount of time that the motor unit 212 is active and delivering mechanical power through the rest of the powertrain 202 that is above the threshold. The engine temperature can correspond to an amount of heat emitted by motor unit 212 during the operation of the vehicle 105. The engine measurements can include statistical metrics over the time window, such as an average, a minimum, a maximum, a variance, a standard deviation, and skewness, among others.

The sensors 204 for acquiring the engine measurements can include, for example, a torque sensor measuring the torque converter 214 or the driveshaft 220, a tachometer measuring the motor unit 212, a thermistor or thermometer measuring the motor unit 212, among others. A single sensor 204 or multiple sensors 204 can be used to acquire the various types of engine measurements. The sensor 204 used to acquire the engine measurements may be same the sensor 204 used to acquire the motion measurements. The sensor 204 used to acquire the engine measurements may be part of the same sensor 204 used to acquire the motion measurements. For example, a single sensor 204 can be comprised of a vehicle speed sensor to measure speed and acceleration and a torque sensor to measure motor torque.

The vehicle 105 can include at least one vehicle control 206 (sometimes referred herein as car controls). The vehicle control 206 can be disposed in a passenger compartment of the vehicle 105. The vehicle control 206 can be electrically coupled with other components of the vehicle 105, such as the powertrain 202. The vehicle control 206 can include a set of input/output components to set or control various functionalities of the vehicle 105 relating to motion of the vehicle 105 and the operations of the powertrain 202. The vehicle control 206 can include, for example, an accelerator pedal, a brake pedal, a gear stick, and a clutch pedal, among others. Using the vehicle control 206, an occupant (e.g., the driver) within the vehicle 105 can control the steering, braking, and acceleration of the vehicle 105. The vehicle control 206 can monitor for an input from the occupant of the vehicle 105. The input can correspond to a command to be applied to the powertrain 202 to set the propulsion of the vehicle 105. For example, the input can correspond to an amount of increase in the speed of the vehicle 105. Upon receipt, the vehicle control 206 (or another component of the vehicle 105) can convert the input into the command to a power command to be applied to the powertrain 202. The vehicle control 206 of the vehicle 105 may lack any input/output component to indicate (e.g., via user input) which type of environment 100 the vehicle 105 is traversing.

The vehicle 105 can include at least one vehicle control unit 208. The vehicle control unit 208 can include hardware components (e.g., one or more processors or memory) or a combination of hardware components and software, as detailed herein in conjunction with FIG. 6. The components of the vehicle control unit 208 can be disposed in the vehicle 105. The vehicle control unit 208 can include logical circuity (e.g., a central processing unit) that responses to and processes instructions fetched from a memory unit. For example, the vehicle control unit 208 can be implemented as one or more printed circuit boards (PCBs) with various hardware components arranged thereon. The central processing unit can utilize instruction level parallelism, thread level parallelism, different levels of cache, and multi-core processors. A multi-core processor can include two or more processing units on a single computing component. The vehicle control unit 208 can be a type of an electronic control unit (ECU) disposed in the vehicle 105 to control various operations and functionalities of the powertrain 202. In controlling the powertrain 202, the vehicle control unit 208 can set or define the power to be consumed by the powertrain 202. The vehicle control unit 208 can also include at least one communications interface to communicate with one or more components within the vehicle 105 and with components outside the vehicle 105 (e.g., via a wireless communications).

The system 200 can include at least one server 210 (also referred herein as a data processing system). The server 210 can include at least one server with one or more processors, memory, and a network interface, among other components. The server 210 can include a plurality of servers located in at least one data center, a branch office, or a server farm. The server 210 can include multiple, logically-grouped servers and facilitate distributed computing techniques. The logical group of servers may be referred to as a data center, server farm or a machine farm. The servers can be geographically dispersed. A data center or machine farm may be administered as a single entity, or the machine farm can include a plurality of machine farms. The servers within each machine farm can be heterogeneous: one or more of the servers or machines can operate according to one or more type of operating system platform. The server 210 can include servers in a data center that are stored in one or more high-density rack systems, along with associated storage systems, located for example in an enterprise data center. The server 210 with consolidated servers in this way can improve system manageability, data security, the physical security of the system, and system performance by locating servers and high performance storage systems on localized high performance networks. Centralization of all or some of the server 210 components, including servers and storage systems, and coupling them with advanced system management tools, allows more efficient use of server resources, which saves power and processing requirements and reduces bandwidth usage. Each of the components of the server 210 can each include at least one processing unit, server, virtual server, circuit, engine, agent, appliance, or other logic device such as programmable logic arrays configured to communicate with other computing devices, such as the vehicle control unit 208 in the vehicle 105. The server 210 can include at least one communications interface to communicate with devices such as the vehicle control unit 208 residing in the vehicle 105 (e.g., via a wireless communications).

The server 210 can include at least one feature extractor 238. The feature recognizer 236 executing on the server 210 can access at least one database 245 to retrieve or identify at least one sample driving pattern 248 (sometimes herein referred to as a driving cycle). A set of sample driving patterns 248 can be maintained on the database 245 included in the server 210 or otherwise communicatively coupled with the server 210. Each sample driving pattern 248 can include a set of measurements of a vehicle (e.g., the vehicle 105) traveling in various types of environments 100 (e.g., the urban environment 110, the mountainous terrain 115, the suburban environment 120, or the highway 125) over a time duration. The time duration for each sample driving pattern 248 can define an amount of time over which the set of measurements are taken, and can range between 30 seconds to 1 hour. The sampling duration for the sample driving pattern 248 can be the same as or can differ from the sampling time window used by the sensor 204 in the vehicle 105.

The measurements in the sample driving patterns 248 may have been acquired from test runs of vehicles 105 in one of the types of environments 100 over one or more sampling time windows. The sample driving patterns 248 can be updated, and new sample driving patterns 248 can be received and maintained by the server 106 for additional processing. The measurements in each sample driving pattern 248 can include motion measurements and engine measurements, among others. The measurements in each sample driving pattern 248 can include motion measurements (e.g., a speed, a velocity, and an acceleration) and engine measurements (e.g., a motor torque, a rotation metric, an engine state, an engine idle time, an engine active time, an output energy, and an engine temperature), among others. The motion measurements and the engine measurements in each sample driving pattern 248 can include statistical metrics of over the sampling time window, such as an average, a minimum, a maximum, a variance, a standard deviation, and skewness, among others.

With the identification, the feature extractor 238 can generate at least one feature vector 252 (sometimes herein referred to as a reference feature vector) using the measurements of the sample driving pattern 248. The feature extractor 238 can parse the sample driving pattern 248 to identify the motion measurements and the engine measurements over the sample interval. Using the motion measurements and the engine measurements, the feature extractor 238 can generate the feature vector 252 corresponding to the measurements of the sample driving pattern 248. The feature vector 252 can include, for example, one or more of: an average velocity, a minimum velocity, a maximum velocity, an average acceleration, a minimum acceleration, a maximum acceleration, an average deceleration, a maximum deceleration, a minimum deceleration, an engine idle time percentage, an engine active time percentage, an average motor torque, a maximum motor torque, a minimum motor torque, and a motor torque variance, among others.

The feature vector 252 can correspond to a representation of the measurements of the sample driving pattern 248 in a feature space. The feature space can be defined by the types of motion measurements and the engine measurements. For example, the feature space can include the dimensions of a velocity, an acceleration, and a motor torque for the sample driving pattern 248 over the sample interval. In this example, a feature vector 252 can represent an amount of velocity, an amount of acceleration, and an amount of motor torque within the dimensions of the sample driving pattern. The feature extractor 238 can generate the feature vector 252 using any type of data structure, such as an array, a matrix, a linked list, a binary tree, a heap, a hash-based structure, and a graph, among others. With the generation, the feature extractor 238 can store and maintain the feature vector 252 on the database 246.

The server 210 can include at least one condition classifier 240. The condition classifier 240 executing on the server 210 can also access the database 245 to identify the sample driving pattern 248. The sample driving pattern 248 can include the measurements of the vehicle 100 traveling through one of the types of the environment 100 (e.g., the urban environment 110, the mountainous terrain 115, the suburban environment 120, or the highway 125) over the sample interval. The condition classifier 240 can categorize or identify at least one environmental condition 254 that the measurements from the vehicle 100 correspond to. The environmental condition 254 can indicate at least one type of environment 100 from which the measurements for the sample driving pattern 248 is acquired. The environmental condition 254 can include one or more of: the urban environment 110, the mountainous terrain 115, the suburban environment 120, or the highway 125, among others. The condition classifier 240 can identify the environmental condition 254 based on the sample driving pattern 248. The sample driving pattern 248 can include a label for the type of environment 100 the measurements correspond to. For example, each sample driving pattern 248 can be pre-labeled as corresponding to one of the urban environment 110, the mountainous terrain 115, the suburban environment 120, or the highway 125. The condition classifier 240 can parse the label to identify the type of environment 100 to which the measurements of the sample driving pattern 248 as the environmental condition 254. The condition classifier 240 can classify, categorize, or otherwise associate the measurements of the sample driving pattern 248 as the environment. The condition classifier 240 can store and maintain the association between the environmental condition 254 and the feature vector 252 onto the database 246.

The condition classifier 240 can apply at least one clustering algorithm to determine or identify the type of environment 100 that the measurements of the sample driving pattern 248 corresponds to. The clustering algorithm can include, for example, a regression algorithm (e.g., a linear regression model or a logistic regression model), a support vector machine (SVM), a k-means clustering algorithm, a Gaussian mixture model, a density-based clustering algorithm, and a discriminant analysis, among others. At least a subset of the sample driving patterns 248 can have a label corresponding to one of the types of environment 100. The label can indicate that the measurements included in the sample driving pattern 248 is acquired from one of the environments 100. The condition classifier 240 can identify the feature vector for each sample driving pattern 248 with the labeling. The condition classifier 240 can identify the feature space in which the feature vectors of the sample driving patterns 248 are defined. The feature vector and the feature space can be determined or generated by the feature extractor 238.

With the identification, the condition classifier 240 can apply the clustering algorithm on the feature vectors in the feature space to determine a classification map. The application of the clustering algorithm can include feature vectors from sample driving patterns 248 without any labeling as to which environment 100 the measurements are acquired. The clustering algorithm may be run multiple times until convergence. The classification map can define one or more regions of the feature space corresponding to one of the types of the environment 100. For example, the classification map can define at least one region for the urban environment 110, at least one region for the mountainous terrain 115, at least one region for the suburban environment 120, and at least one region for the highway 125. Each feature vector generated from one of the sample driving patterns 248 can be assigned to one of the regions corresponding to the type of environment 100. The condition classifier 240 can identify the region to which the feature vector for the corresponding sample driving pattern 248 is assigned. Using the identification, the condition classifier 240 can classify, categorize, or otherwise identify the type of environment 100 defined by the region of the classification map as the environmental condition 254. The condition classifier 240 can associate the identified environmental condition 254 with the feature vector 252 generated from the same sample driving pattern 248. For each of feature vectors from sample driving patterns 248 without labeling, the condition classifier 240 can identify the environment condition 254 from the region in the classification map to which the feature vector is assigned. The condition classifier 240 can store and maintain the association between the environmental condition 254 and the feature vector 252 onto the database 246. The condition classifier 240 can store and maintain the classification map used to categorize onto the database 246.

The server 210 can include at least one parameter calculator 242. The parameter calculator 242 executing on the server 210 can generate a set of regulation parameters 256 for each sample driving pattern 248. The set of regulation parameters 256 can specify or determine the values for the parameters at which the powertrain 202 of the vehicle 105 is to operate. The values of the set of regulation parameters 256 at which the powertrain 202 is to operate can correspond to the values at which the vehicle 105 is to achieve optimal energy consumption or fuel efficiency.

The set of regulation parameters 256 can specify values for one or more of the components of the powertrain 202 of the vehicle 105, such as the motor unit 212, the torque converter 214, the transmission unit 216, the transfer case 218, the driveshaft 220, the differential unit 222, and the drive axles 224, among others. The set regulation parameters 256 can include values related to the motor torque to be applied throughout the powertrain 202 (e.g., from the motor unit 212 via the torque converter 214), such as a minimum motor torque to be outputted and a maximum torque allowed to be outputted, among others. For example, the range of motor torque can range between 100 Nm to 750 Nm. The set of regulation parameters 256 can include values related to the rotation metric through the motor unit 212 of the powertrain 202, such as a minimum rotation rate and a maximum rotation rate, among others. For example, the range of rotation rate can range between −2500 RPM to 17500 RPM. The set of regulation parameters 256 can includes values related to the mechanical power to be outputted by the motor unit 212 or other parts of the powertrain 202, such as a minimum mechanical power and a maximum mechanical power, among others. For example, the range of the mechanical power can range between −100 kW to 400 kW.

In generating the set of regulation parameters 256, the parameter calculator 242 can determine the values at which the vehicle 105 is to achieve optimal energy consumption given the measurements of the sample driving pattern 248 and the corresponding type of environment 100. The parameter calculator 242 can parse the sample driving pattern 248 to identify the motion measurements and the engine measurements. With the identification, the parameter calculator 242 can determine the set of regulation parameters 256 using the engine measurements of the sample driving pattern 248. In determining, the parameter calculator 242 can determine the values of the regulation parameters 256 to apply to the one or more components of the powertrain 202 to achieve or effectuate the engine measurements of the sample driving pattern 248. The determination can be in accordance a mapping of engine measurements to values for each component of the powertrain 202. The mapping can define a value for each component of the powertrain 202 for a given set of engine measurements (e.g., motor torque, rotation metric, and engine idle time or active time). Different vehicle components can have different loss maps with respect to different operating variables (e.g., torque, rotating speed for electric motor, temperature, and remaining charge for battery). The assumption of this determination may be that the engine measurements are approximate to the optimal energy consumption for the vehicle 105 in the type of environment 100 from which the sample driving pattern 248 are acquired. Furthermore, by identifying the driving pattern during operation, the vehicle control unit 105 can determine the suitable range and trajectory for a particular operating variable to be at for the driving pattern recognized. The range and trajectory may be chosen for the regions where losses are relatively smaller. This control strategy may guarantee at least local optimality (locally minimum loss) for energy consumption in the vehicle 105.

The server 210 can include at least one profile generator 244. The profile generator 244 executing on the server 210 can generate at least one operation profile 250 for each sample driving sample 248. The operation profile 250 can be generated by the profile generator 244 to include the feature vector 252, the environmental condition 254, and the set of regulation parameters 256 for the corresponding sample driving sample 248. For each sample driving sample 248, the profile generator 244 can identify: the feature vector 252 generated by the feature extractor 238, the environmental condition 254 identified by the condition classifier 240, and the set of regulation parameters 256 determined by the parameter calculator 242. With the identification, the profile generator 244 can bundle, combine, or otherwise generate the operation profile 250 using the feature vector 252, the environmental condition 254, and the set of regulation parameters 256. The profile generator 244 can store and maintain the operation profile 250 on the database 246 for provision to the vehicle control unit 208 of the vehicle 105. The operation profile 250 can be any type of data structure, such as an array, a matrix, a linked list, a binary tree, a heap, a hash-based structure, and a graph, among others. The profile generator 244 can arrange each operation profile 250 on the database 246 with an index identifier.

The vehicle control unit 208 can include at least one profile maintainer 228. The profile maintainer 228 executing on the vehicle control unit 208 can store and maintain at least one operation profile 250 on at least one database 236. The database 236 can be memory or a storage disposed in vehicle 105 and can be communicatively coupled with the one or more processors forming the vehicle control unit 208. The profile maintainer 228 can fetch, retrieve, or otherwise receive at least one operation profile 250 from the server 210. To retrieve, the profile maintainer 228 can establish a communication session 258 with the server 210. For example, when the vehicle 105 is located within an effective radius of a network access point, the communication interface of the vehicle control unit 208 can establish the communication session with 258 the server 210 via the network access point. The network access point can include a cellular base station, a wireless router, or a wired network connection, among others.

Once established, the profile maintainer 228 can send a request to the server 210 via the communication session 258. The request can be sent via the server 210 in response to the establishment of the communication session 258. The request can be to update the operation profiles 250 already stored on the database 236 of the vehicle control unit 208. With receipt of the request, the profile generator 244 running on the server 210 can access the database 246 to identify the set of operation profiles 250. The identified set of operation profiles 250 can be all of the operation profiles 250 generated using the sample driving patterns 248. The profile generator 244 on the server 210 can return, transmit, or send the set of operation profiles 250 to the vehicle control unit 208 via the communication session 258. In turn, the profile maintainer 228 can receive the set of operation profiles 250 from the server 210. The profile maintainer 228 can store and maintain the set of operation profiles 250 on the database 235 for use by the other components of the vehicle control unit 208. Each operation profile 250 received from the server 106 can include the feature vector 252, the environmental condition 254, and the regulation parameters 256, among others, all generated from the same sample driving pattern 258.

The vehicle control unit 208 can include at least one measurement aggregator 230. The measurement aggregator 230 executing on the vehicle control unit 208 can retrieve, receive, or otherwise identify the measurements acquired by one or more of the sensors 204. The measurements identified from the sensor 204 can include both the motion measurements and the engine measurements. The measurement aggregator 230 can identify the measurements from the sensor 204 using a moving time window. The time window can define an amount of time elapsed between one identification of the measurements to the subsequent identification of measurements. The time window can overlap for one identification of measurements can partially overlap with the time window for the next identification of measurements. The time window can correspond to the sampling time window to allow for the accumulation of measurements. The length of the time window can equal the sampling time window, and can range between 30 seconds to 10 minutes. The length of the time window used for the measurements can be preset.

The motion measurements identified by the measurement aggregator 230 over the time window can include: a speed, a velocity, an acceleration, and a deceleration, among others. The measurement aggregator 230 can determine the statistical metrics of each motion measurement over the sampling time window, such as an average, a minimum, a maximum, a variance, a standard deviation, and skewness, among others. The engine measurements identified by the measurement aggregator 230 over the time window can include: a motor torque applied through the powertrain 202, a rotation metric of the motor unit 212 in applied the motor torque, an engine state of the motor unit 212, an engine idle time and an engine active time of the motor unit 212, and an engine temperature of the motor unit 212, among others. The measurement aggregator 230 can determine the statistical metrics of each engine measurement over the sampling time window, such as an average, a minimum, a maximum, a variance, a standard deviation, and skewness, among others.

With the identification, the measurement aggregator 230 can generate at least one feature vector using the motion measurements and the engine measurements identified from the sensor 204. The feature vector can be generated by the measurement aggregator 230 using the motion measurements and the engine measurements over the time window. The measurement aggregator 230 can generate the feature vector in the same or similar manner that the feature extractor 238 generated the feature vectors 252 included in the operation profiles 250. The feature vector generated by the measurements aggregator 230 can include, for example, one or more of: an average velocity, a minimum velocity, a maximum velocity, an average acceleration, a minimum acceleration, a maximum acceleration, an average deceleration, a maximum deceleration, a minimum deceleration, an engine idle time percentage, an engine active time percentage, an average motor torque, a maximum motor torque, a minimum motor torque, and a motor torque variance, among others. The feature vector can correspond to a representation of the motion and engine measurements from the sensor 204 of the vehicle 105 in a feature space. The feature space can be defined by the types of motion measurements and the engine measurements.

The vehicle control unit 208 can include at least one pattern recognizer 232. The pattern recognizer 232 executing on the vehicle control unit 208 can compare the measurements identified from the sensor 204 with the measurements of the sample driving patterns 248 as indicated in each of the operation profiles 250. To compare the measurements, the pattern recognizer 232 can compare the feature vector generated using the measurements from the sensor 204 with the feature vector 252 in each operation profile 250. In comparing, the pattern recognizer 232 can calculate, generate, or determine at least one distance metric between the feature vector generated from the measurements of the sensor 204 with each feature vector 252 of the operation profile 250. The distance metric (also referred herein as a distance or a norm) can indicate a degree of difference between the feature vectors within the feature space. The distance metric can be, for example, a Euclidean distance, a Manhattan norm, or any form of L-p norm, among others. The calculation of the distance metric by the pattern recognizer 232 can be performed in O(1) time, quicker and consuming less computing resources compared to more complex approaches.

Based on the comparison between the measurements from the sensor 204 and the measurements of the sample driving patterns 248 as indicated in the operation profiles 250, the pattern recognizer 232 can identify or select one of the set of operation profiles 250. The pattern recognizer 232 can select the operation profile 250 based on the distance metrics determined between the feature vector from the sensor 204 with the feature vector 252 in each operation profile 250. In selecting, the pattern recognizer 232 can identify the operation profile 250 with the feature vector 252 that has the lowest distance metric with the feature vector generated using the measurements from the sensor 204. The operation profile 250 with the lowest distance metric can correspond to the sample driving pattern 248 that is most similar to the driving conditions of the vehicle 105 from which the motion and engine measurements are acquired. With the identification, the pattern recognizer 232 can select the operation profile 250 from the set of operation profiles 250 maintained on the database 236 for additional processing. The operation profile 250 can correspond to one of the index identifiers for the set of operation profiles 250.

With the selection of one of the operation profiles 250, the pattern recognizer 232 can identify the environmental condition 254 included in the operation profile 250. The pattern recognizer 232 can parse the selected operation profile 250 to identify the environmental condition 254. The environmental condition 254 can indicate one of the types of environment 100, such as the urban environment 110, the mountainous terrain 115, the suburban environment 120, or the highway 125, among others. The environmental condition 254 indicated by the operation profile 250 correspond to the type of environment 100 the vehicle 105 is traveling through, as indicated by the measurements from the sensor 204. By using the distance metrics in selecting, the pattern recognizer 232 can identify and select the operation profile 250 from the set of operation profiles 250 and the corresponding environmental condition 254 without user input via one of the vehicle controls 206. For example, the selection of the operation profile 250 can be performed without a user input indicating the type of environment 100 the vehicle 105 is traveling through.

The vehicle control unit 208 can include at least one powertrain controller 234. The powertrain controller 234 executing on the vehicle control unit 208 can identify the set of regulation parameters 256 specified by the selected operation profile 250. The powertrain controller 234 can parse the selected operation profile 250 to identify the set of regulation parameters 256. The set of regulation parameters 256 can be identified as associated with the environment condition 254 form the same operation profile 250, and can include the values to be applied to the powertrain 202 of the vehicle 105. The powertrain controller 234 can also identify each value specified by the set of regulation parameters 256, such as values for one or more of the components of the powertrain 202 of the vehicle 105, such as the motor unit 212, the torque converter 214, the transmission unit 216, the transfer case 218, the driveshaft 220, the differential unit 222, and the drive axles 224, among others. The set of regulation parameters 256 identified by the powertrain controller 234 can also include the values related to the motor torque to be applied throughout the powertrain 202, the values related to the rotation metric through the motor unit 212 of the powertrain 202, and the values related to the mechanical power to be outputted by the motor unit 212, among others.

With the identification, the powertrain controller 234 can apply the set of regulation parameters 256 of the operation profile 250 to the powertrain 202 of the vehicle 105. The powertrain controller 234 can set or otherwise configure the powertrain 202 of the vehicle 105 to operate in accordance with the set of regulation parameters 256. In applying the regulation parameters 256, the powertrain controller 234 can set or configure the motor torque outputted by the motor unit 212 within the values specified by the regulation parameters 256. For example, the motor torque propagating through the powertrain 202 can be limited to the minimum and maximum motor torque specified by the regulation parameters 256. The powertrain controller 234 can set or configure the rotation metric through the components of the powertrain 202 to the values specified by the regulation parameters 256. For instance, the rotation speed of one or more of the components in the powertrain 202 can be constrained by the minimum and maximum rotation rate defined by the regulation parameters 256. The powertrain controller 234 can set or configure the mechanical power outputted by the motor unit 212 through the powertrain 202 to the values specified by the regulation parameters 256. For example, the mechanical power outputted by the powertrain 202 can be limited to the minimum and maximum mechanical power as specified by the regulation parameters 256 of the operation profile 250. The powertrain controller 234 can also configure each individual component of the powertrain 202, such as the motor unit 212, the torque converter 214, the transmission unit 216, the transfer case 218, the driveshaft 220, the differential unit 222, and the drive axles 224, in accordance with the set of regulation parameters 256.

The powertrain controller 234 can hold and maintain the application of the regulation parameters 256 to the powertrain 202 for a moving time window. The time window can define an amount of time elapsed between one application (and holding) of the regulation parameters 256 and the subsequent application (and holding) of the regulation parameters 256. The time window can overlap for one application of the regulation parameters 256 can partially overlap with the time window for the next application of the regulation parameters 256. The time window for the regulation parameters 256 can correspond to the time window between identification of the measurements to the subsequent identification of measurements. For example, the time window for the regulation parameters 256 can be offset by a set time subsequent to the time window for the identification of the measurements. The time window can correspond to the sampling time window to allow for the accumulation of measurements, or can differ from the sampling time window8.The time window for the application of the regulation parameters 256 can equal the sampling time window, and can range between 30 seconds to 10 minutes. The length of the time window used for the measurements can be preset.

In this manner, the vehicle control unit 208 can configure the power consumed by the powertrain 202 of the vehicle 105 when traveling through the environment 100 in response to detecting the type of environment 100. Furthermore, by requesting the set of operation profiles 250 from the server 106 in this manner, the involvement of the vehicle control unit 208 in determining and generating the operation profiles 250 can be eliminated. In addition, the consumption of computing resources in generating the operation profiles 250 can be offloaded from the vehicle control unit 208 to the server 210, which can have far greater computing resources than the vehicle control unit 208. Because such calculations are offloaded, other electronic control units in the vehicle 105 can lack configuration to control the powertrain 202 of the vehicle 105 using measurements from specialized sensors. In addition, such electronic control units can also lack complex or specialized hardware to perform calculations in regards to setting parameters to control the powertrain 202.

Figure 3:
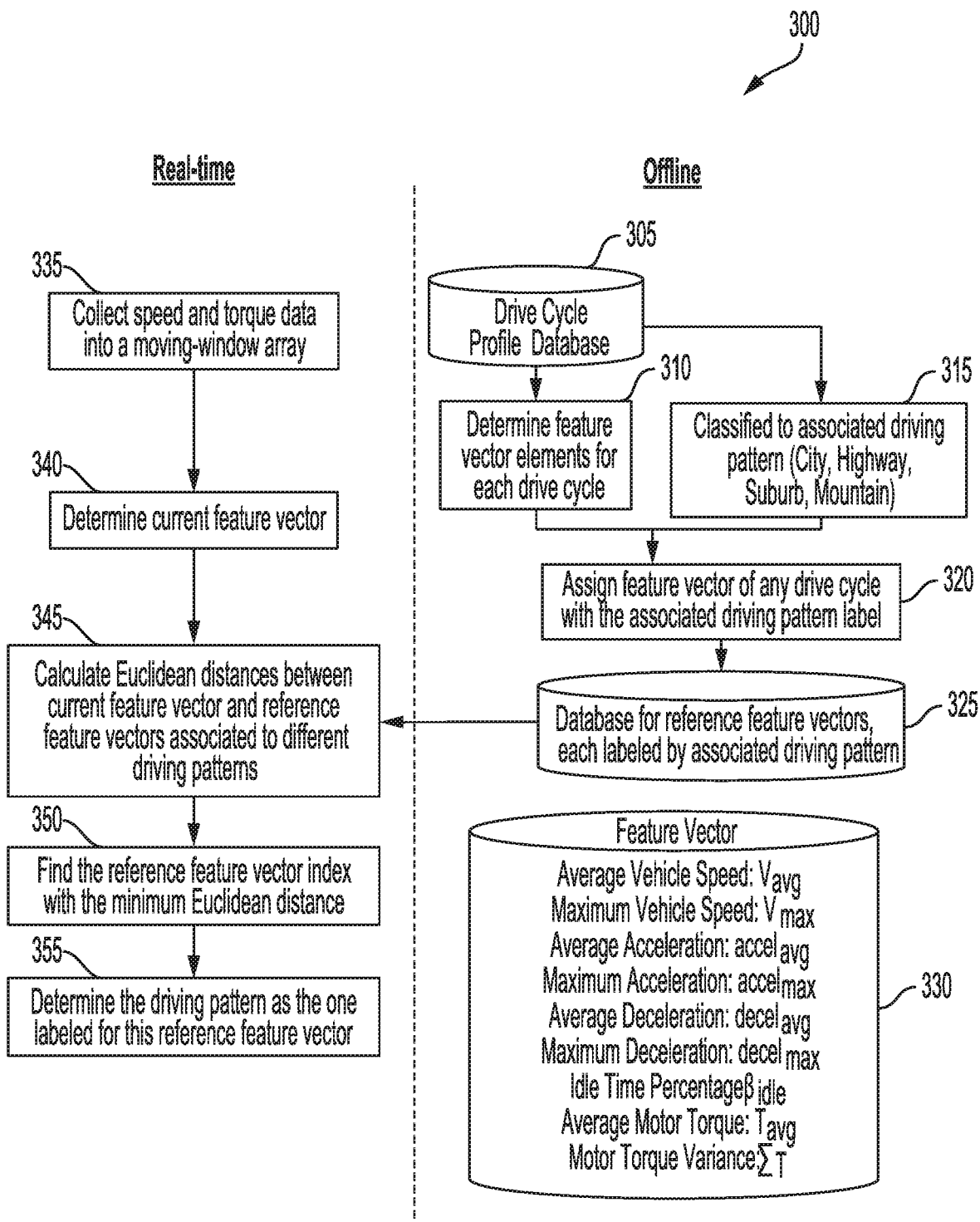
FIG. 3 is a flow diagram of an example method of regulating vehicle powertrains in electric vehicles using driving patterns.

FIG. 3, among others, depicts a flow diagram of a method 300 of regulating vehicle powertrains in electric vehicles using driving patterns. The functionalities of the method 300 can be implemented or performed by the various components of the vehicle 105 as detailed herein above in conjunction with FIGS. 1 and 2 or the computing system 600 as described herein below on FIG. 6, or any combination thereof. Under the method 300, the functionalities of (305)-(330) can be performed offline or remotely from the vehicle control unit 208 of the vehicle 105, such as the server 210. The functionalities of (335)-(355) can be performed in real-time, or on the vehicle control unit 208 as the vehicle 105 is traveling through the environment 100.

The server 210 can retrieve drive cycle profiles from a database (305). The server 210 can determine feature vector elements for each drive cycle (310). In conjunction, the server 210 can classify each driving cycle to n associated driving pattern, such as a city, a highway, a suburb, or a mountain (315). The server 210 can assign the feature vector of each drive cycle with the associated driving pattern (320). The server 210 can store and maintain the reference feature vector with each labeled by an associated driving pattern onto a database, and can provide the data to a vehicle control unit 208 (325). The reference feature vector maintained by the server 210 can include: an average velocity, a maximum velocity, an average acceleration, a maximum acceleration, an average deceleration, a maximum deceleration, an engine idle time percentage, an average motor torque, and a motor torque variance, among others (330).

The vehicle control unit 208 can collect speed and torque data in a moving window array (335). The vehicle control unit 208 can determine a current feature vector (340). The vehicle control unit 208 can calculate Euclidean distances between the current feature vector and the reference feature vectors associated to different driving patterns (345). The vehicle control unit 208 can find the reference feature vector with the minimum Euclidean distance (350). The vehicle control unit can determine the driving pattern as the one labeled for the reference feature vector, and can apply the parameters (355).

Figure 4:
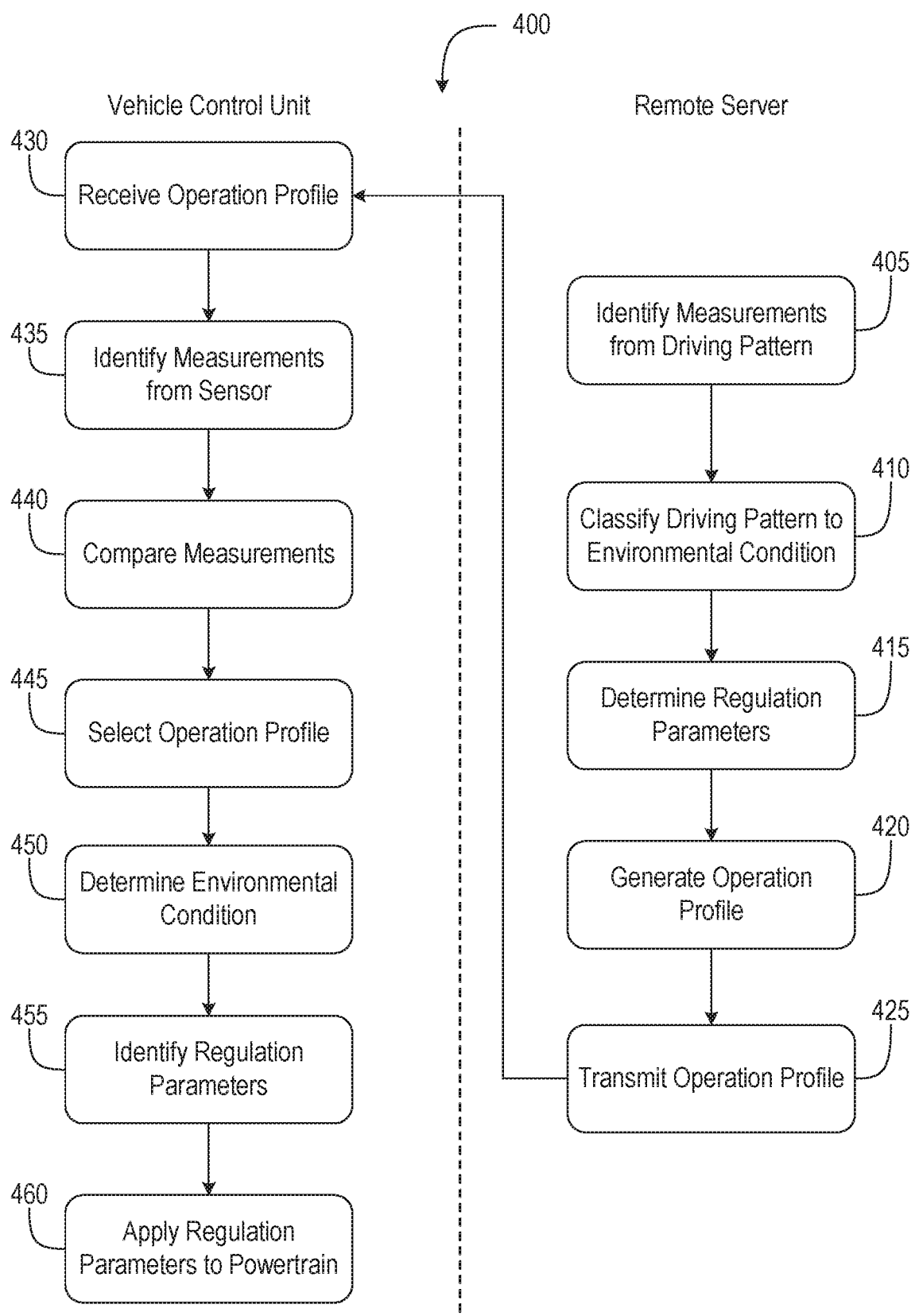
FIG. 4 is a flow diagram of an example method of regulating vehicle powertrains in electric vehicles using driving patterns.

FIG. 4, among others, depicts a flow diagram of a method 400 of regulating vehicle powertrains in electric vehicles using driving patterns. The functionalities of the method 400 can be implemented or performed by the various components of the vehicle 105 as detailed herein above in conjunction with FIGS. 1 and 2 or the computing system 600 as described herein below on FIG. 6, or any combination thereof. The method 400 can include identifying measurements from a sample driving pattern 248 (405). The server 210 can parse the sample driving pattern 248 to identify motion measurements and engine measurements of a vehicle 105 in a test run for the sample driving pattern 248. Both measurements can be defined over a sampling time window. The motion measurements can include a speed, a velocity, and an acceleration, among others. The engine measurements can include a motor torque, a rotation metric, an engine state, an engine idle time, an engine active time, and an engine temperature, among others. Using the measurements of each sample driving pattern 248, the server 210 can generate a feature vector 252 for the sample driving pattern 248. The feature vectors 252 can be defined over a feature space.

The method 400 can include classifying the sample driving pattern 248 to an environmental condition 254 (410). The server 210 can identify a type of environment 100 from which the sample driving pattern 248 is acquired. At least a subset of the sample driving patterns 248 can be labeled with the type of environment 100, such as the urban environment 110, the mountainous terrain 115, the suburban environment 120, or the highway 125, among others. The server 210 can use the sample driving patterns 248 with the label to identify the type of environment 100 for the other sample driving patterns 248. The server 210 apply a clustering algorithm to identify regions within the feature space corresponding to the types of environment 100. Based on where the feature vector 525 resides in the regions of the feature space, the server 210 can assign each sample driving pattern 248 to an environmental condition 254 corresponding to one of the types of environment 100.

The method 400 can include determining regulation parameters 256 (415). The server 210 can determine the set of regulation parameters 256 for each sample driving pattern 248 based on the engine measurements of the sample driving pattern 248. The regulation parameters 256 can include values related to the motor torque to be applied throughout a powertrain 202 of the vehicle 105, the rotation rate through one or more components of the powertrain 202, and mechanical power to be outputted by the powertrain 202, among others. The values in the regulation parameters 256 can be used to set the powertrain 202 to operate in accordance with the specifications regarding motor torque, rotation rate, and mechanical power, among others.

The method 400 can include generating an operation profile 250 (420). For each sample driving pattern 248, the server 210 can package or generate the operation profile 250 to include the feature vector 252, the environmental condition 254, and the set of regulation parameters 256 from the same sample driving pattern 248. With the generation, the server 210 can store and maintain the set of operation profiles 250 onto the database 246. The method 400 can include transmitting the operation profile 250 (425). A vehicle control unit 208 and the server 210 can establish a communication session 258. Over the communication session 258, the server 210 can send the set of operation profiles 250 to the vehicle control unit 208. The method 400 can include receiving the operation profile (430). Upon receipt, the vehicle control unit 208 can store and maintain the set of operation profiles 250 onto the database 236.

The method 400 can include identifying measurements from a sensor 204 (435). The sensor 204 can acquire motion measurements and engine measurements of the vehicle 105 while in operation and traveling through the environment 100. The vehicle control unit 208 can identify both measurements over a sampling time window. The motion measurements can include a speed, a velocity, and an acceleration, among others. The engine measurements can include a motor torque, a rotation metric, an engine state, an engine idle time, an engine active time, and an engine temperature, among others. The time window can overlap for one identification of measurements can partially overlap with the time window for the next identification of measurements, and can define an amount of time during which the measurements are to be acquired.

The method 400 can include comparing measurements (440). The vehicle control unit 208 can generate a feature vector using the measurements from the sensor 204. The motion and engine measurements used to generate the feature vector can be over the time window. The vehicle control 208 can be defined over the feature space. With the generation, the vehicle control unit 208 can compare the feature vector from sensor 204 with the feature vector 252 of each operation profile 250. To compare, the vehicle control unit 208 can determine a distance metric (e.g., a Euclidean distance) between the generated feature vector with the feature vector 252 of each operation profile 250.

The method 400 can include selecting an operation profile 250 (445). The vehicle control unit 208 can select one of the set of operation profiles 250 based on the comparison of the feature vector generated from the measurements of the sensor 204 with the feature vector 252 of each operation profile 250. The vehicle control unit 208 can identify the operation profile 250 that has the feature vector 525 corresponding to the lowest distance metric with the feature vector generated from the measurements of the sensor 204.

The method 400 can include determining an environmental condition 254 (450). The vehicle control unit 208 can identify the environmental condition 254 specified by the selected operation profile 250. The environmental condition 254 can be one or more of: the urban environment 110, the mountainous terrain 115, the suburban environment 120, or the highway 125, among others. The method 400 can include identifying regulation parameters 256 (455). The vehicle control unit 208 can identify the regulation parameters 256 specified by the selected operation profile 250. The regulation parameters 256 can include values related to the motor torque to be applied throughout a powertrain 202 of the vehicle 105, the rotation rate through one or more components of the powertrain 202, and mechanical power to be outputted by the powertrain 202, among others.

The method 400 can include applying regulation parameters 256 to the powertrain 202 (460). The vehicle control unit 208 can configure one or more components of the powertrain 202 in accordance with the regulation parameters 256 of the operation profile 250. The components of the powertrain 202 can include the motor unit 212, the torque converter 214, the transmission unit 216, the transfer case 218, the driveshaft 220, the differential unit 222, and the drive axles 224, among others. In applying the regulation parameters, the vehicle control unit 208 can set or configure the operation of one or more components of the powertrain 202.

Figure 5:
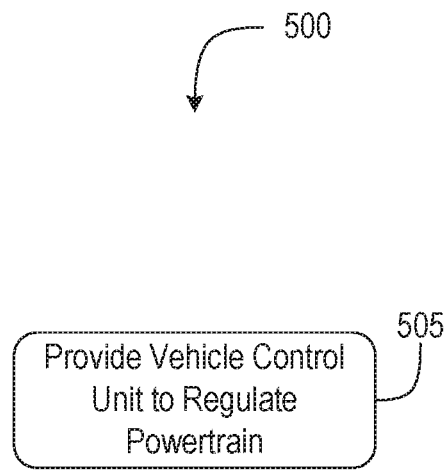
FIG. 5 is a flow diagram of an example method of providing vehicle control units to regulate vehicle powertrains in electric vehicles using driving patterns.

FIG. 5, among others, depicts a flow diagram of a method 500 of providing vehicle control units to regulate vehicle powertrains in electric vehicles using driving patterns. The functionalities of the method 500 can be implemented or performed by the various components of the vehicle 105 as detailed herein above in conjunction with FIGS. 1 and 2 or the computing system 600 as described herein below on FIG. 6, or any combination thereof. The method 500 can include providing a vehicle control unit 208 to regulate a powertrain 202 (505). The vehicle control unit 208 can installed within a vehicle 105. The vehicle control unit 208 can be coupled with one or more components of the vehicle 105 (e.g., via wired or wireless connection), such as the powertrain 202 and a set of sensors 204, among others. In addition, the vehicle control unit 208 can include processors and memory configured to perform the functionalities of the profile maintainer 228, the measurement aggregator 230, the pattern recognizer 232, and the powertrain controller 234. The vehicle control unit 208 may have been pre-installed in the vehicle 105, and can be subsequently programmed to perform the functionalities of the profile maintainer 228, the measurement aggregator 230, the pattern recognizer 232, and the powertrain controller 234, the method 300, or the method 400, as detailed herein. For example, a script or an executable containing the functionalities can be uploaded onto the memory of the vehicle control unit 208 and can be installed to run from the vehicle control unit 208.

Figure 6:
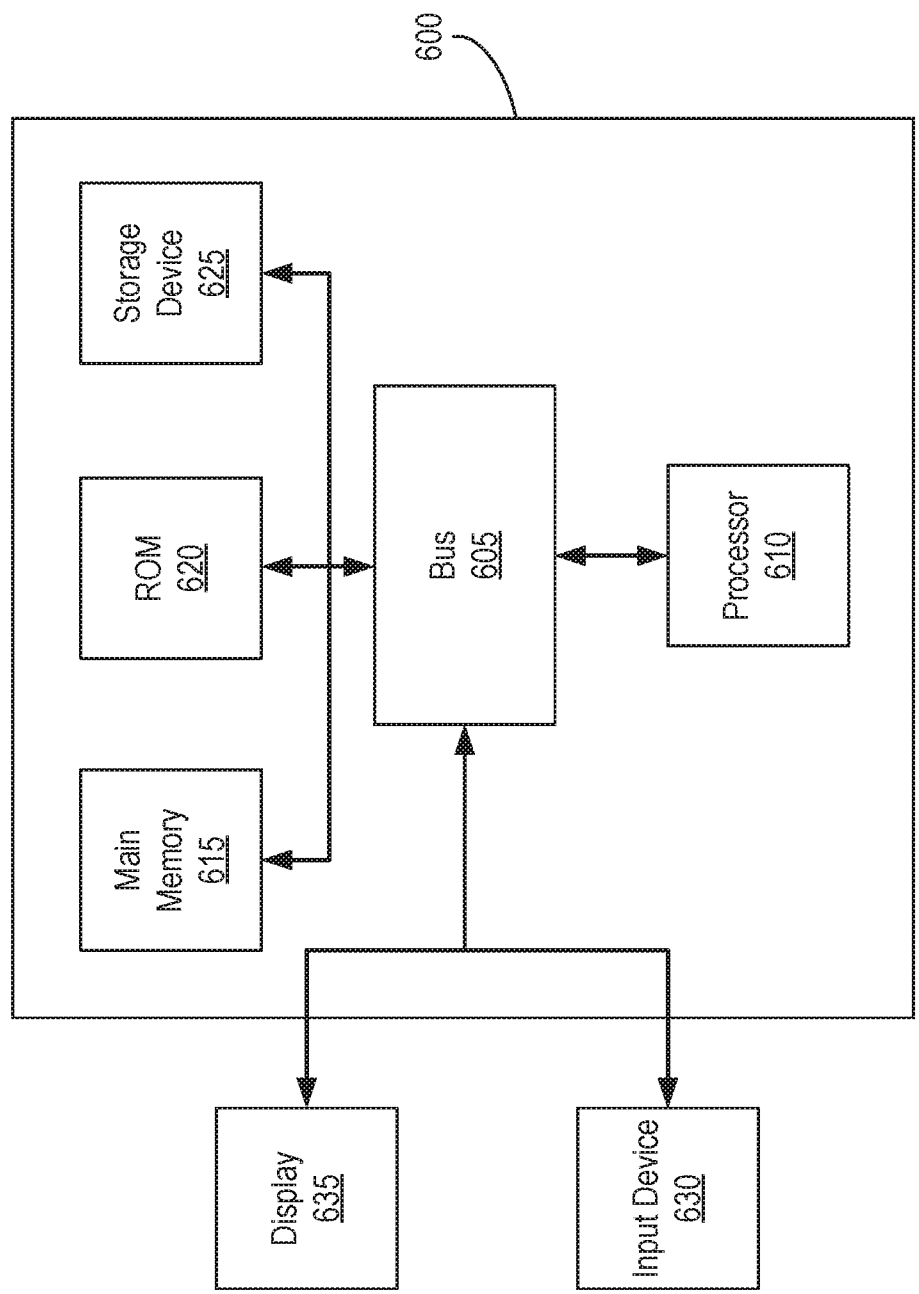
FIG. 6 is a block diagram illustrating an architecture for a computer system that can be employed to implement elements of the systems and methods described and illustrated herein.

FIG. 6 depicts a block diagram of an example computer system 600. The computer system or computing device 600 can include or be used to implement the vehicle control unit 28 or the server 210. The computing system 600 includes at least one bus 605 or other communication component for communicating information and at least one processor 610 or processing circuit coupled to the bus 605 for processing information. The computing system 600 can also include one or more processors 610 or processing circuits coupled to the bus for processing information. The computing system 600 also includes at least one main memory 615, such as a random access memory (RAM) or other dynamic storage device, coupled to the bus 605 for storing information, and instructions to be executed by the processor 610. The main memory 615 can also be used for storing position information, vehicle information, command instructions, vehicle status information, environmental information within or external to the vehicle, road status or road condition information, or other information during execution of instructions by the processor 610. The computing system 600 may further include at least one read only memory (ROM) 620 or other static storage device coupled to the bus 605 for storing static information and instructions for the processor 610. A storage device 625, such as a solid state device, magnetic disk or optical disk, can be coupled to the bus 605 to persistently store information and instructions.

The computing system 600 may be coupled via the bus 605 to a display 635, such as a liquid crystal display, or active matrix display, for displaying information to a user such as a driver of the electric vehicle 105. An input device 630, such as a keyboard or voice interface may be coupled to the bus 605 for communicating information and commands to the processor 610. The input device 630 can include a touch screen display 635. The input device 630 can also include a cursor control, such as a mouse, a trackball, or cursor direction keys, for communicating direction information and command selections to the processor 610 and for controlling cursor movement on the display 635. The display 635 (e.g., on a vehicle dashboard) can be part of the vehicle 105, or other component of FIG. 1 or 2, as well as part of the server 210 for example.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components (e.g., various modules of the vehicle control unit 208 and the server 210), and illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "data processing system" "computing device" "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations,"

"one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. For example, while vehicle 105 is often referred to herein by example as an electric vehicle 105, the vehicle 105 can include fossil fuel or hybrid vehicles in addition to electric powered vehicles and examples referencing the electric vehicle 105 include and are applicable to other vehicles 105. Further, an electric vehicle may have a powertrain that is fully or partially electrically powered. For example a hybrid vehicle can be considered an electric vehicle. Scope of the systems and methods described herein is thus indicated by the appended claims, rather than the foregoing description, and changes that come within the meaning and range of equivalency of the claims are embraced therein.

What is claimed is:

1. A system to regulate vehicle powertrains in electric vehicles using driving patterns, comprising:
    a sensor disposed in an electric vehicle to acquire a first measurement and a second measurement of the electric vehicle, the first measurement including at least one of a velocity of the electric vehicle and an acceleration of the electric vehicle, the second measurement including an amount of motor torque applied by a vehicle powertrain in controlling propulsion of the electric vehicle; and
    a vehicle control unit having one or more processors disposed in the electric vehicle, the vehicle control unit to:
    maintain a plurality of operation profiles, each of the plurality of operation profiles identifying: (i) a corresponding reference feature vector including a first measurement and a second measurement, (ii) a set of regulation parameters to be applied to the vehicle powertrain for the corresponding reference feature vector, and (iii) a corresponding environmental condition of a plurality of environmental conditions;
    generate a feature vector including the first measurement and the second measurement acquired by the sensor;
    determine a distance metric between the feature vector and the corresponding reference feature vector specified by at least one of the plurality of operation profiles;
    select an operation profile from the plurality of operation profiles based on the distance metric;
    identify the set of regulation parameters for the corresponding environmental condition of the plurality of environmental conditions specified by the operation profile selected from the plurality of operation profiles; and
    apply the set of regulation parameters to the vehicle powertrain to control the propulsion of the electric vehicle in accordance with the operation profile.

2. The system of claim 1, comprising the vehicle control unit to:
    receive, from at least one server remote from the electric vehicle via a communication session, the plurality of operation profiles, each operation profile of the plurality of operation profiles generated by the at least one server by determining the set of regulation parameters for the first measurement and the second measurement specified for the operation profile.

3. The system of claim 1, comprising the vehicle control unit to:
    receive, from at least one server remote from the electric vehicle via a communication session, the plurality of operation profiles, each operation profile of the plurality of operation profiles generated by the at least one server by classifying the first measurement and the second measurement specified for the operation profile as at least the corresponding environmental condition of the plurality of environmental conditions.

4. The system of claim 1, comprising the vehicle control unit to:
    store, on memory coupled with the one or more processors, the plurality of operation profiles, each of the plurality of operation profiles specifying the set of regulation parameters to be applied to the vehicle powertrain for the specified feature vector including the first measurement and the second measurement identified as associated with the corresponding environmental condition of the plurality of environmental conditions.

5. The system of claim 1, comprising the vehicle control unit to:
    identify, using a time window, the first measurement and the second measurement from the sensor, the time window defining an amount of time between each acquisition from the sensor.

6. The system of claim 1, comprising the vehicle control unit to:
    identify, from the sensor, the first measurement over a time window, the first measurement of the electric vehicle including at least one of an average velocity, an extremum velocity, an average acceleration, an extremum acceleration, the time window defining an amount of time prior to a current time; and identify, from the sensor, the second measurement over the time window, the second measurement of the vehicle powertrain including at least one of an idle time proportion, an average motor torque, and a motor torque variance.

7. The system of claim 1, comprising the vehicle control unit to:
generate the feature vector including the first measurement and the second measurement acquired from the sensor, the feature vector defined in a feature space.

8. The system of claim 1, comprising the vehicle control unit to:
determine a distance metric within a feature space between the feature vector and the reference feature vector specified by at least one of the plurality of operation profile.

9. The system of claim 1, comprising the vehicle control unit to:
identify the corresponding environmental condition of the plurality of environmental conditions from the operation profile, the plurality of environmental conditions including at least one of a highway environment, a metropolitan environment, a suburb environment, and a mountain environment.

10. The system of claim 1, comprising the vehicle control unit to:
identify the set of regulation parameters for the corresponding environmental condition of the plurality of environmental conditions specified by the operation profile selected from the plurality of operation profiles, the set of regulation parameters including a motor torque to be applied by the vehicle powertrain over a time window, the time window defining an amount of time from a current time.

11. The system of claim 1, comprising the vehicle control unit to:
select the operation profile from the plurality of operation profiles without user input via a vehicle control of the electric vehicle.

12. The system of claim 1, comprising:
an electronic control unit having one or more processors disposed in the vehicle, the electronic control unit lacking configuration to control the vehicle powertrain based on one or more measurements.

13. An electric vehicle, comprising:
a vehicle powertrain to control propulsion;
a sensor to acquire a first measurement and a second measurement of the electric vehicle, the first measurement including at least one of a velocity and an acceleration, the second measurement including an amount of power applied by the vehicle powertrain in controlling propulsion; and
a vehicle control unit having one or more processors, the vehicle control unit to:
maintain a plurality of operation profiles, each of the plurality of operation profiles identifying: (i) a corresponding reference feature vector including a first measurement and a second measurement, (ii) a set of regulation parameters to be applied to the vehicle powertrain for the corresponding reference feature vector, and (iii) a corresponding environmental condition of a plurality of environmental conditions;
generate a feature vector including the first measurement and the second measurement acquired by the sensor;

determine a distance metric between the feature vector and the corresponding reference feature vector specified by at least one of the plurality of operation profiles;
select an operation profile from the plurality of operation profiles based on the distance metric;
identify the set of regulation parameters for the corresponding environmental condition of the plurality of environmental conditions specified by the operation profile selected from the plurality of operation profiles; and
apply the set of regulation parameters to the vehicle powertrain to control the propulsion in accordance with the operation profile.

14. The electric vehicle of claim 13, comprising the vehicle control unit to:
store the plurality of operation profiles onto memory communicatively coupled with the one or more processors, each of the plurality of operation profiles specifying the set of regulation parameters to be applied to the vehicle powertrain for the specified feature vector including the first measurement and the second measurement identified as associated with the corresponding environmental condition of the plurality of environmental conditions.

15. The electric vehicle of claim 13, comprising the vehicle control unit to:
generate the feature vector including the first measurement and the second measurement acquired from the sensor, the feature vector defined in a feature space.

16. The electric vehicle of claim 13, comprising the vehicle control unit to:
determine a distance metric within a feature space between the feature vector and the reference feature vector specified by at least one of the plurality of operation profiles.

17. The electric vehicle of claim 13, comprising the vehicle control unit to:
identify, from the sensor, the first measurement over a time window, the first measurement of the electric vehicle including at least one of an average velocity, an extremum velocity, an average acceleration, an extremum acceleration, the time window defining an amount of time prior to a current time; and
identify, from the sensor, the second measurement over the time window, the second measurement of the vehicle powertrain including at least one of an idle time proportion, an average motor torque, and a motor torque variance.

18. A method of regulating vehicle powertrains in electric vehicles using driving patterns, comprising:
acquiring, by a sensor disposed in an electric vehicle, a first measurement and an second measurement of the electric vehicle, the first measurement including at least one of a velocity of the electric vehicle and an acceleration of the electric vehicle, the second measurement including an amount of motor torque applied by a vehicle powertrain in controlling propulsion of the electric vehicle;
maintaining, by a vehicle control unit having one or more processors disposed in the electric vehicle, a plurality of operation profiles, each of the plurality of operation profiles identifying: (i) a corresponding reference feature vector including a first measurement and a second measurement, (ii) a set of regulation parameters to be applied to the vehicle powertrain for the corresponding reference feature vector, and (iii) a corresponding environmental condition of a plurality of environmental conditions;
generating, by the vehicle control unit, a feature vector including the first measurement and the second measurement acquired by the sensor;
determining, by the vehicle control unit, a distance metric between the feature vector and the corresponding reference feature vector specified by at least one of the plurality of operation profiles;
selecting, by the vehicle control unit, an operation profile from the plurality of operation profiles based on the distance metric;
identifying, by the vehicle control unit, the set of regulation parameters for the corresponding environmental condition of the plurality of environmental conditions specified by the operation profile selected from the plurality of operation profiles; and
applying, by the vehicle control unit, the set of regulation parameters to the vehicle powertrain to control the propulsion of the electric vehicle in accordance with the operation profile.

19. The method of claim 18, comprising:
generating, by the vehicle control unit, the feature vector including the first measurement and the second measurement acquired from the sensor, the feature vector defined in a feature space.

20. The method of claim 18, comprising:
determining, by the vehicle control unit, a distance metric within a feature space between the feature vector and the reference feature vector specified by at least one of the plurality of operation profiles.

* * * * *